US008692842B2

(12) United States Patent
Lin et al.

(10) Patent No.: US 8,692,842 B2
(45) Date of Patent: Apr. 8, 2014

(54) METHOD AND SYSTEM FOR AUTOMATICALLY TESTING A RASTER IMAGE PROCESSOR (75) Inventors: Hao Lin, Beijing (CN); Zhangwei Mhng, Beijing (CN); Shuiyu Nan, Beijing (CN); Ken Chen, Beijing (CN); Genglin Huang, Beijing (CN); Yong Ji, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 278 days.

(21) Appl. No.: 13/121,317

(22) PCT Filed: Sep. 28, 2009

(86) PCT No.: PCT/CN2009/074276
§ 371 (c)(1),
(2), (4) Date: Sep. 20, 2011

(87) PCT Pub. No.: WO2010/034262
PCT Pub. Date: Apr. 1, 2010

(65) Prior Publication Data
US 2012/0013626 A1   Jan. 19, 2012

(30) Foreign Application Priority Data

Sep. 28, 2008  (CN) .......................... 2008 1 0223632

(51) Int. Cl.
G09G 5/02 (2006.01)
(52) U.S. Cl.
USPC .......................................... 345/590; 345/589
(58) Field of Classification Search
USPC ..................... 345/589, 590; 358/1.9; 382/203
See application file for complete search history.

(56) References Cited

FOREIGN PATENT DOCUMENTS

CN       101387983 A    3/2009
JP       200138970 A    2/2001
JP       2006123371 A   5/2006

Primary Examiner — Jacinta M Crawford
(74) Attorney, Agent, or Firm — The Webb Law Firm (57) ABSTRACT Disclosed is a method and system for automatically testing a raster image processor. The method may identify the correctness of the bitmap output by the raster image processor to be tested by comparing an abstract code of a bitmap generated by the RIP to be tested with that generated by a reference RIP to determine whether they are consistent with each other, so as to identify the correctness and stability of the RIP to be tested. Furthermore, the test samples can be submitted automatically. Thus, the convenience and efficiency are improved with respect to the manual submitting.

14 Claims, 4 Drawing Sheets

METHOD AND SYSTEM FOR AUTOMATICALLY TESTING A RASTER IMAGE PROCESSOR

FIELD OF THE INVENTION

The present invention relates to a method and system for performing automatic test, especially relates to a method and system for automatically testing a raster image processor.

BACKGROUND OF THE INVENTION

The raster image processor (RIP) is a kind of interpreter, which is used for interpreting and transforming page information described with a page description language to data (which is generally a bitmap) which can be output by an output device.

At present, the process for testing an RIP is as follows. A tester manually submits a test sample to an RIP to be tested and a reference RIP. The RIPs interpret the test sample and output respective bitmaps. Then, the bitmaps are compared with one another. If no difference is recognized by human eyes, it is considered that the RIP to be tested interprets the sample correctly. If an RIP to be tested can interpret a large number of test samples correctly, it is considered that this RIP passes the test.

It can be seen from the above process for testing an RIP that the manual test method has the following disadvantages (1) The test samples are submitted manually, which is inconvenience. (2) The test samples are submitted manually, which may be arbitrary and has disadvantages against the regression test. (3) The test result is recognized by human eyes, which lacks reliability.

SUMMARY OF THE INVENTION

To overcome the deficiencies in the prior art, the present invention provides a method and system for automatically testing a raster image processor by employing a computer to check the correctness of the testing result, which has high reliability and accuracy.

Another object of the present invention is to provide a method and system for automatically testing a raster image processor, in which test samples are submitted automatically and the workload and arbitrariness of manual submitting is reduced.

To achieve at least one of the above-mentioned objects, the present invention provides a method for automatically testing a raster image processor, comprising (1) submitting test samples;

(2) executing each of the test samples submitted in the step (1) on a reference raster image processor and generating a reference bitmap for each of the test samples;

(3) generating an abstract code of the reference bitmap for each of the test samples and entering each abstract code into a record list of permanent abstract codes;

(4) executing each of the test samples submitted in the step (1) on a raster image processor to be tested and generating a test bitmap for each of the test samples;

(5) generating an abstract code of the test bitmap for each of the test samples, comparing the abstract code of the test bitmap with the abstract code of the reference bitmap for the same test sample recorded in the record list of permanent abstract codes, and storing the abstract code of the test bitmap into a record list of temporary abstract codes if the abstract code of the test bitmap and the abstract code of the reference bitmap for the same test sample are not consistent with each other; and (6) checking the test bitmap and reference bitmap for the test sample corresponding to the abstract codes recorded in the record list of temporary abstract codes, returning a message indicating an error to the developer if the test bitmap is erroneous, and replacing a record in the record list of permanent abstract codes with a corresponding record in the record list of temporary abstract codes if the reference bitmap is erroneous.

The present invention also provides a system for automatically testing a raster image processor, comprising a raster image processor subsystem (11) and a database subsystem (12).

The raster image processor subsystem (11) may comprise a reference raster image processor (110); a raster image processor (111) to be tested; and an abstract code processor (112), wherein the abstract code processor (112) is configured to generate an abstract code of a reference bitmap or an abstract code of a test bitmap for a test sample after the test sample is interpreted by the reference raster image processor (110) or the raster image processor (111) to be tested and to compare the abstract code of the reference bitmap with the abstract code of the test bitmap for the test sample to determine whether the abstract code of the reference bitmap and the abstract code of the test bitmap for the test sample are consistent with each other.

The database subsystem (12) may comprise a database module (120) configured to store a record list of permanent abstract codes and a record list of temporary abstract codes, wherein the record list of permanent abstract codes is configured to store abstract codes of reference bitmaps and the record list of temporary abstract codes is configured to store the abstract code of the test bitmap which is inconsistent with the abstract code of the reference bitmap for the same test sample; a database interface module (121) configured to perform operations of adding, modifying, deleting and inquiring on data in the database module (120); a data display module (122) configured to display the data stored in the database module (120); and an import/export module (123) configured to import records in the record list of temporary abstract codes to the record list of permanent abstract codes.

The present invention may achieve at least one of the following effects. One can accurately determine whether a bitmap rasterized by the reference raster image processor is consistent with that rasterized by the raster image processor to be tested by comparing the abstract codes of the bitmaps. In contrast to the determination by means of human eyes, the precision of test is improved. Furthermore, the test samples can be submitted automatically. Thus, the convenience and efficiency are improved with respect to the manual submitting.

DESCRIPTION OF THE PREFERRED EMBODIMENTS

Hereinafter, a detailed description of the present invention will be given with reference to the embodiments and the appended drawings.

The concept of the present invention is to identify the correctness of the bitmap output by the raster image processor (RIP) to be tested by comparing an abstract code of a bitmap generated by the RIP to be tested with that generated by a reference RIP (i.e., an RIP having relatively stable performance) to determine whether they are consistent with each other, so as to identify the correctness and stability of the RIP to be tested.

Figure 1:
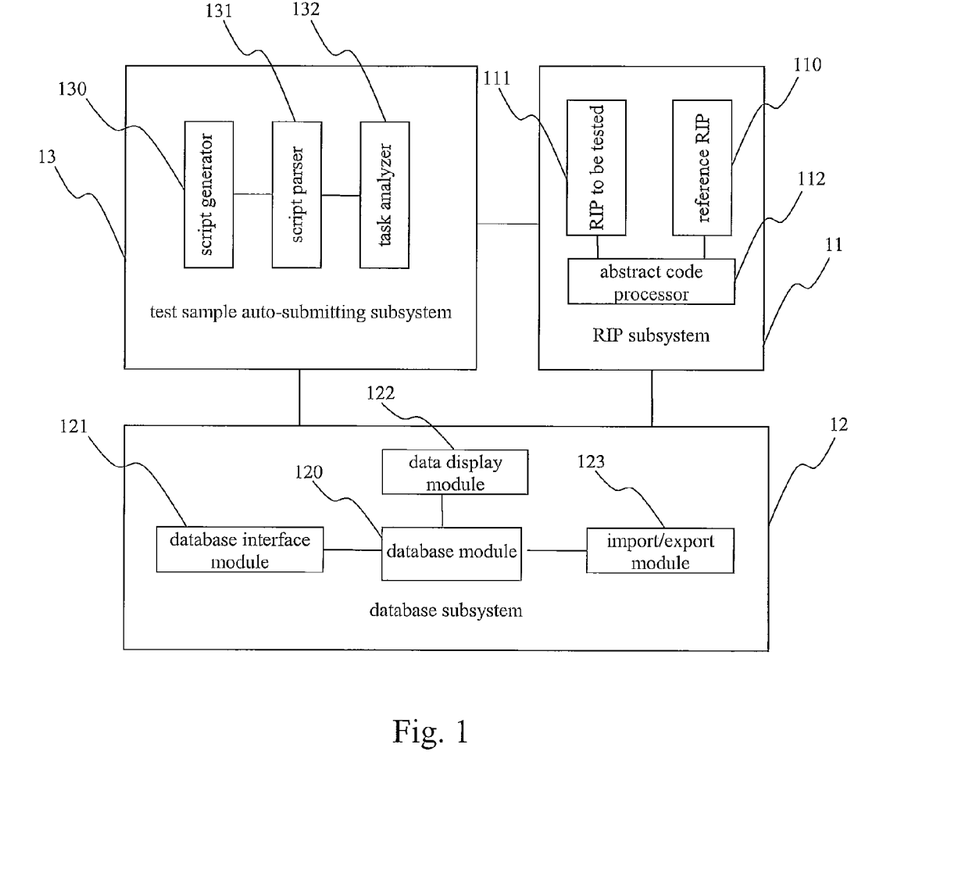
FIG. 1 shows the configuration of a according to the present invention.

FIG. 1 shows the configuration of a system for automatically testing the RIP according to the present invention, which comprises an RIP subsystem 11 and a database subsystem 12.

In FIG. 1, the RIP subsystem 11 comprises a reference RIP 110, an RIP to be test 111 and an abstract code processor 112. The abstract code processor 112 is used to generate an abstract code of a reference bitmap or an abstract code of a test bitmap, and to compare the abstract code of the reference bitmap with the abstract code of the test bitmap for the same test sample to determine whether the abstract codes are consistent with each other. The reference RIP 110 interprets the test sample to generate a bitmap, and then the abstract code processor 112 processes the bitmap to generate the so-called abstract code of the reference bitmap. The RIP 111 to be tested interprets the test sample to generate a bitmap, and then the abstract code processor 112 processes the bitmap to generate the so-called abstract code of the test bitmap.

The database subsystem 12 comprises a database module 120, a database interface module 121, a data display module 122 and an import/export module 123. The database module 120 is used to store a record list of permanent abstract codes, a record list of temporary abstract codes and a record list of execution status. The record list of permanent abstract codes is used to store abstract codes of reference bitmaps. The record list of temporary abstract codes is used to store the abstract code of the test bitmap which is inconsistent with the abstract code of reference bitmap for the same test sample. The record list of execution status is used to store the status of execution of the test sample on the reference RIP 110 and the RIP 111 to be tested. The database interface module 121 involves the operations of adding, modifying, deleting, inquiring and so on which are performed on the data in the database module 120. For example, the operations of adding, modifying, deleting and inquiring are performed on the records in the record list of permanent abstract codes, in the record list of temporary abstract codes and in the record list of execution status. The data display module 122 is used to display the data stored in the database module 120, such as the records in the record list of permanent abstract codes, in the record list of temporary abstract codes and in the record list of execution status. The import/export module 123 is used to selectively import the records in the record list of temporary abstract codes to the record list of permanent abstract codes.

In the present embodiment, the record list of permanent abstract codes and the record list of temporary abstract codes have the same structure as follows.

| ID | File ID | Template ID | Page | Color Face ID | Test Machine ID | Version | Abstract Code |
|---|---|---|---|---|---|---|---|

| Field | notes |
|---|---|
| ID | main key |
| File ID | the ID in the list for recording files |
| Template ID | the ID in the list for recording templates |
| Page | page number |
| Color Face ID | the ID in the list for recording color faces |
| Test Machine ID | the ID in the list for recording test machines (for reference) |
| Version | the version in which the RIP generates the bitmap (for reference) |
| Abstract Code | the abstract code of the bitmap, the MD5 code may be used |

The record list of execution status for the test sample has the following structure.

| ID | File ID | Template ID | Test Machine ID | Version | Status |
|---|---|---|---|---|---| wherein the status may be DONE, UNDONE and EXCEPTIONAL.

The status DONE indicates the test sample is ended properly.

The status UNDONE indicates the test sample is ended improperly. That is, there is an error in the interpretation process, which may derive from the test sample itself.

The status EXCEPTIONAL indicates abnormal conditions may exist when this test sample is interpreted, which may cause the system exits. In this case, it indicates that the RIP to be tested has severe a deficiency.

In the present embodiment, the system may also comprise a subsystem 13 for automatically submitting test samples. The subsystem 13 is used for performing the function of automatically submitting test samples. The subsystem 13 comprises a script generator 130, a script parser 131 and a task analyzer 132. The script generator 130 is used to generate a test script which is substantially a task package storing a large amount of tasks. The script parser 131 is used to parse the test script generated by the script generator 130, to extract a test sample from the test script, and to send the extracted test sample to the task analyzer 132. The task analyzer 132 is used to determine whether the record list of execution status or the record list of permanent abstract codes has recorded the current test sample to be executed, and to perform a corresponding process to the test sample based on the result of determination.

In the present embodiment, the system may have the following four kinds of status: a common status, a direct storing status, a synchronous storing status and a return test status.

In the common status, the system tests the RIP according to the procedures in the prior art and does not generate any abstract code of a bitmap. The system has such a common status so that it is compatible with existing test manners.

In the direct storing status, the system performs the following process. The script parser 131 extracts a test sample and submits it to the task analyzer 132. The task analyzer 132 determines whether the record list of execution status has recorded this test sample. If yes, the task analyzer 132 performs a corresponding process to the test sample according to its status, which will be described in detail hereafter. If the test sample needs to be interpreted on the reference RIP 110, the abstract code processor 112 will generate an abstract code of bitmap for the test sample based on the bitmap obtained from the interpretation and the generated abstract code of bitmap is stored in the record list of permanent abstract codes.

In the synchronous storing status, the system performs the following process. The script parser 131 extracts a test sample and submits it to the task analyzer 132. The task analyzer 132 determines whether the record list of permanent abstract codes has recorded this test sample. If yes, the test sample will not be interpreted and it directly turns to the next test sample. Otherwise, the system performs the same process as it is in the direct storing status. The system has such a synchronous storing status so that after a test document is added to the prepared test script, the test script with the added test document can be submitted to the reference RIP and it is ensured that the test samples recorded in the record list of permanent abstract codes are no longer interpreted when the abstract codes for test samples are generated so as to improve the storing efficiency.

In the return test status, the system performs the following process. The script parser 131 extracts a test sample and submits it to the task analyzer 132. The task analyzer 132 determines whether the test sample has been recorded in the record list of execution status. If yes, the task analyzer 132 performs a corresponding process to the test sample according to its status. If the test sample needs to be interpreted by the RIP 111 to be tested, the abstract coder processor 112 will generate an abstract code of bitmap for the test sample based on the bitmap obtained from the interpretation and compare the generated abstract code with the abstract code for the same test sample recorded in the record list of permanent abstract codes. If the two abstract codes are consistent with each other, the system will output "consistent". Otherwise, the system will output "inconsistent" and store the abstract code in the record list of temporary abstract codes.

Figure 2:
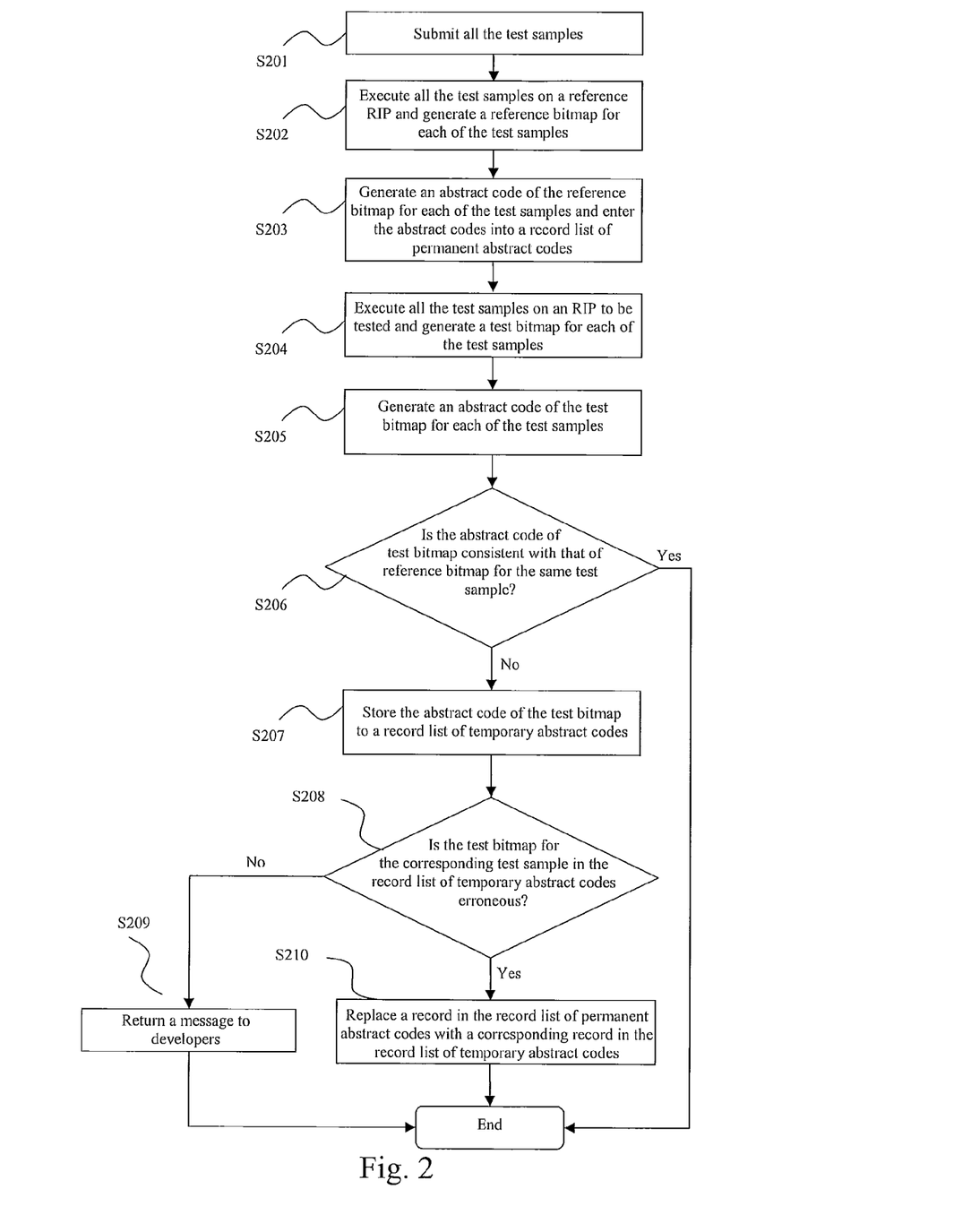
FIG. 2 is a flowchart of the method according to the present invention.

FIG. 2 shows a flowchart of a method for automatically testing an RIP with the system according to the present invention, which comprises the following steps.

Assuming there is a RIP in a version of 3001 and the RIP is determined to have a stable performance by test, the RIP is regarded as a reference RIP 110 in the present embodiment. An RIP in a version of 3007 is regarded as an RIP 111 to be tested.

(1) Submit all the test samples (step S201).

A method for automatically submitting the test samples in the present embodiment comprises the following steps.

(a) A test script is produced in the script generator 130. The produced test script is submitted to the script parser 131 and is stored in a test script library so that the test script can be used during the process of regression test.

(b) The script parser 131 analyzes the type of the test script and determines whether the type of the test script is allowable. If no, the script parser 131 reports that the type of the test script is mismatching, and the process is ended.

The type of the test script may be "folder set and template set" and "file and template" set, and the format thereof is described in detail as follows.

```
Folder set and template set
    [TestFileDoc]
        Count = n;
        DocPath0 =                          %full path
        DocPath1=
        ......
    [Template]
        Count = n;
        TPL0 =                              % the name of template
        TPL1 =
    "File and template" set
    [RecordCount]
        Count=n ;
        [0]
            FILENAME=                       % full path
            TEMPLATENAME=                   % the name of template
        [1]
            FILENAME= ...
            TEMPLATENAME= ...
    ......
```

Figure 3:
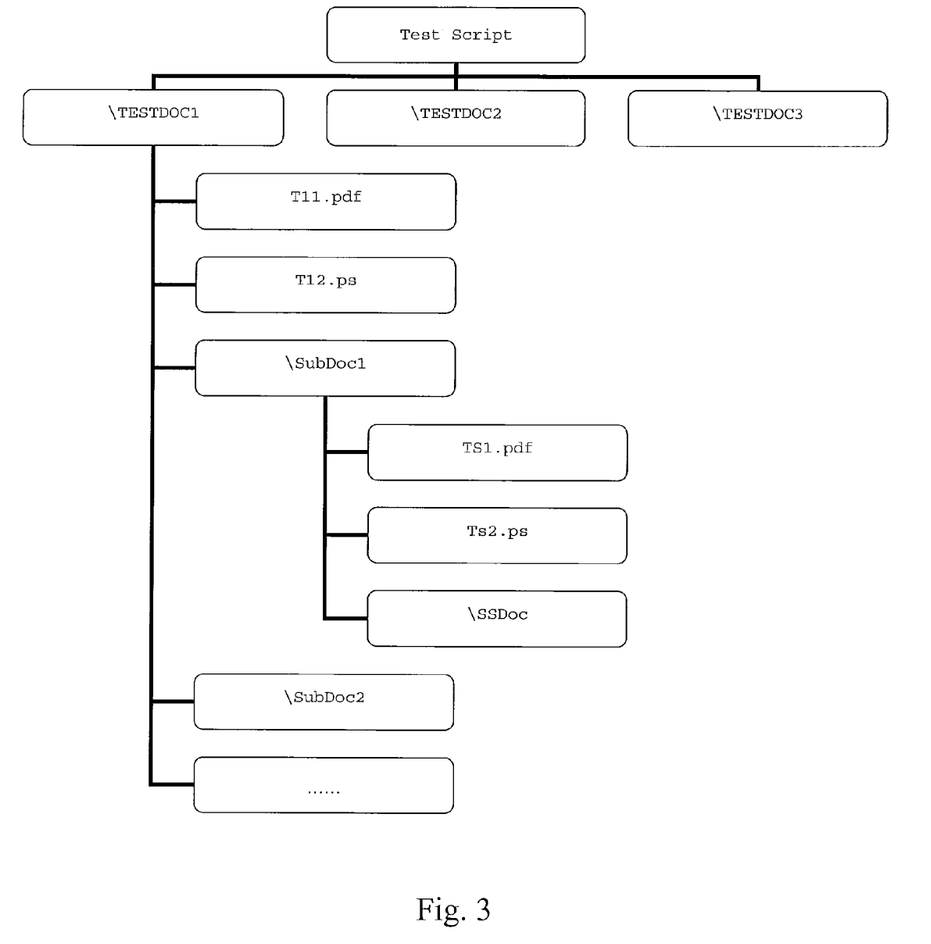
FIG. 3 is a schematic view of a test script according to an embodiment.

FIG. 3 shows the structure of the test script in the present embodiment. It is assumed that there are there folds TESTDOC1, TESTDOC2 and TESTDOC3 in the test script. Each of the folds comprises a number of documents in PDF, PS and the like or comprises a number of subfolders such as SubDoc1 and SubDoc2. The set of templates comprises TP1 and TP2.

When preparing the test script, we can choose a set of three folders and a set of two templates to form a test script "script1" having the type of "folder set and template set". The contents of the script are as follows.

```
[TestFileDoc]
    Count = 3;
        DocPath0 =\\TFS\TESTDOC1
        DocPath1= \\TFS\TESTDOC2
        DocPath2=\\TFS\TESTDOC3
[Template]
    Count = 2;
        TPL0 = TP1
        TPL1= TP2
```

(c) The script parser 131 traverses the test script, extracts test samples and submits the extracted test samples to the task analyzer 132.

Where the type of the test script is "folder set and template set", the test script is traversed and all the files in the folder set are combined with all the templates in the template set so that one file and one template forms a test sample in the type of "file and template". Where the type of the test script is "file and template" set, the test script is traversed and test samples in the type of "file and template" are extracted directly.

In the present embodiment, the script parser 131 firstly traverses the folder TESTDOC1 in the manner similar to the Depth Traversal. The T11.pdf is extracted and combined with TP1 and TP2, respectively, to form two test samples. Then, The T12.pdf is extracted and also combined with TP1 and TP2, respectively, to form two test samples. When the subfolder SubDoc1 is traversed, the TS1.pdf therein is extracted and combined with TP1 and TP2, respectively, to form two test samples. Then, the TS2.ps is extracted and also combined with TP1 and TP2, respectively, to form two test samples, and so forth. After the TESTDOC1 is traversed, the TESTDOC2 and TESTDOC3 are traversed successively. In this way, all the files in these folders can be combined with all the templates to form test samples so that automatic submitting test samples can be achieved.

(2) The system is set to be in the direct storing status. The RIP in the version of 3001 is set to be the reference RIP in the RIP subsystem 11. The RIP in the version of 3001 processes all the test samples submitted in the step (1) to generate a reference bitmap for each test sample (step S202). Then, the abstract code processor 112 generates an abstract code of reference bitmap for each test sample, combines each abstract code with test file ID, template ID, page, color face ID, test machine ID and version to form a record, and enters the record to the record list of permanent abstract codes (step S203).

Each test sample comprises a number of pages and color faces. In the process of generating a reference bitmap (i.e. a rasterized bitmap) for each test sample, rasterized bitmaps for each page and each color face are generated. In the present embodiment, the MD5 code is used as the abstract code. The abstract code processor 112 performs the MD5 calculation on the rasterized bitmaps for each page and each color face to generate an MD5 code as the abstract code of the reference bitmap.

MD5 (Message-digest Algorithm 5) processes input messages in packets of 512 bits and each packet is to be divided into 16 sub-packets of 32 bits. After the 16 sub-packets of 32 bits undergo a series of processes, a value consisting of 4 packets of 32 bits is output and the 4 packets of 32 bits are concatenated to generate a Hash value of 128 bits. The MD5 is typically applied to generate an abstract for a message so that the message can be avoided from being modified.

The abstract code may be generated in other manners, for example, by feature contour data. What manner is used to generate the abstract code depends on the requirements for the test accuracy. If a high test accuracy is needed, the MD5 code may be used as an abstract code.

After all the test samples in the test script are recorded (that is, the abstract codes of reference bitmaps for all the test samples are generated and are stored in the record list of permanent abstract codes), if a test document or template is added to the test script after a period of time and it is needed to execute all the test samples included in the test script having the added test document or template on the reference RIP, the abstract codes of bitmaps for the new test samples are stored into the record list of permanent abstract codes. The following two manners may be used to store the abstract codes of bitmaps of the new test samples. On the one hand, a new test script may be added and the added test document is designed to be tested. On the other hand, the manner of synchronous storing may be used. In practice, the added new test document may be unknown to a tester and the test script library may be kept stable for a period of time during which no new test scripts are added thereto once the test script library is fixed. Thus, the manner of synchronous storing is recommended.

For example, in the present embodiment, a subfolder SSDoc is added into the subfolder SubDoc1 of the test script as shown in FIG. 3. The subfolder SSDoc contains some new test documents. In the manner of synchronous storing, the process of recording a test sample consisting of the test documents in the subfolder SSDoc and the template is as follows. The test script with the added subfolder is submitted and the system is set to be in the synchronous storing status. It is determined whether the test sample has been recorded in the record list of permanent abstract codes before the reference RIP 110 executes the test sample. If yes, the execution of the test sample is skipped and other operations are similar to those in the direct storing status.

(3) The system is set to be in the return test status. It turns to the RIP in the version of 3007 in the RIP subsystem 11. All the test samples submitted in the step (1) are executed on the RIP in the version of 3007 and the test bitmap for each test sample is generated (step S204).

In the process of executing test samples on the reference RIP 110 and the RIP 111 to be tested, the execution status is entered into the record list of execution status. The execution status of a test sample may be normal status (DONE), erroneous status (UNDONE) and abnormal status (EXCEPTIONAL). If the execution of a test sample is ended properly, the execution status of the test sample is marked with DONE. If an error occurs in the execution of a test sample, the execution status of the test sample is marked with UNDONE. If an abnormality occurs in the execution of a test sample, the execution status of the test sample is marked with EXCEPTIONAL.

The main purpose of recording the execution status of test samples is as follows. If an abnormality occurs in the process of interpreting a test sample on the reference RIP 110 or the RIP 111 to be tested so that the process of interpreting is ended improperly, the interpreted test samples or the test samples on which abnormalities occur can be skipped after the test script is resubmitted. Thus, time may be saved and manual intervention may be decreased.

Figure 4:
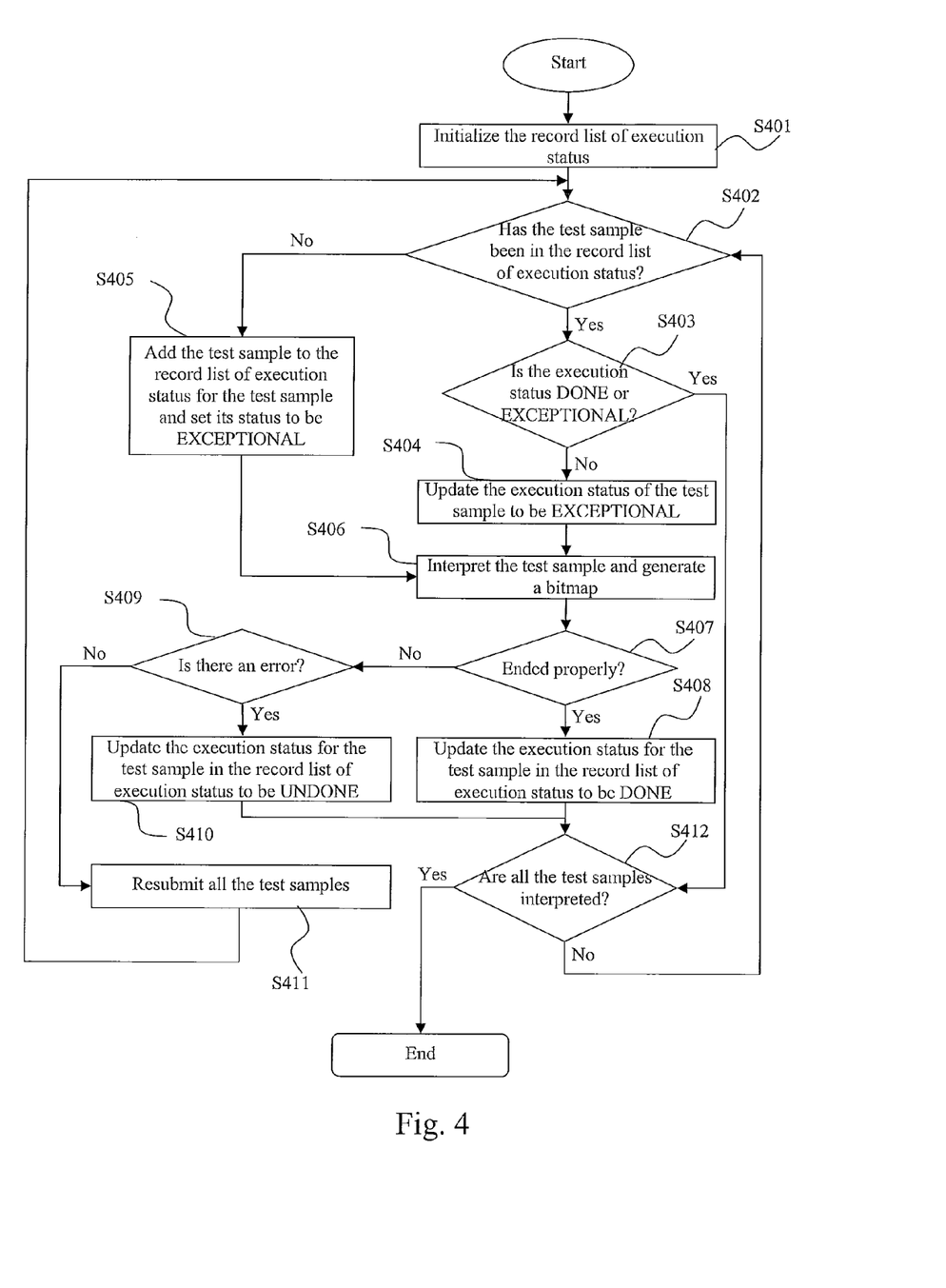
FIG. 4 is a flowchart of executing test samples on an RIP according to an embodiment.

FIG. 4 shows a process in which the submitted test samples are executed on the reference RIP 110 or the RIP 111 to be tested and reference bitmaps or test bitmaps for the test samples are generated. The process as shown in FIG. 4 comprises the following steps.

(a) Initialize the record list of execution status (step S401) and clean up all the data in the list;

(b) Determine whether a submitted test sample has been recorded in the record list of execution status (step S402); if yes, perform the following steps according to the execution status of the test sample: determine whether the execution status is DONE or EXCEPTIONAL (step S403), if yes, turn to the step S412; if the execution status is UNDONE, update the execution status of the test sample to be EXCEPTIONAL (step S404); if submitted test sample has not been recorded in the record list of execution status, add the test sample to the record list of execution status and set the status of the test sample to be EXCEPTIONAL (step S405);

(c) Interpret the test sample and generate a reference bitmap or test bitmap for the test sample (step S406);

(d) Determine whether the process of interpreting the test sample is ended properly (step S407), if yes, update the execution status of the test sample in the record list of execution status to be DONE (step S408), and then perform the step S412; if it is determined in the step S407 that the process of interpreting the test sample is ended improperly, determine whether an error occurs in the process of interpreting the test sample (step S409), if yes, update the execution status of the test sample in the record list of execution status to be UNDONE (step S410), if an abnormality instead of an error occurs, resubmit all the test samples (step S411) and turn to the step S402;

(e) Determine whether all the test samples have been interpreted (step S412), if yes, the process is ended, if no, repeat from the step S402 to the step S412 to interpret the next submitted test sample until all the test samples are interpreted.

(4) The abstract code processor 112 generates an abstract code of a test bitmap for each test sample (step S205) and compares the abstract code of the test bitmap with the abstract code of the reference bitmap for the same test sample recorded in the record list of permanent abstract codes to determine whether the two abstract codes are consistent with each other (step S206). If yes, the process is ended. Otherwise, the abstract code of the test bitmap is combined with test file ID, template ID, page, color face ID, test machine ID and version to form a record, and the record is entered into the record list of temporary abstract codes (step S207).

(5) After the test is finished, the data display module 122 in the database subsystem 12 displays the record list of execution status so as to show the execution of the test samples for the tester. If there are erroneous and/or abnormal test samples, it indicates that the RIP 111 to be tested needs to be modified.

By means of the data display module 122 in the database subsystem 12, the record list of temporary abstract codes could be displayed. The tester could determine the version in which the bitmap is erroneous according to the test bitmap and reference bitmap for the test sample corresponding to the abstract code recorded in the record list of temporary abstract codes (step S208). If the bitmap corresponding to the return-test version RIP is erroneous, the message will be returned to developers (step S209). If the reference bitmap is erroneous, the import/export module 123 will import the record in the record list of temporary abstract codes to the record list of permanent abstract codes to replace the corresponding record in the record list of permanent abstract codes (step S210).

When the RIP in the same version returns to test, if a record exists in the record list of temporary abstract codes, it indicates the RIP in this version is unstable.

It is noted that the method and system of the present invention are not limited to the above embodiments. Other embodiments obtained by the skilled in the art according to the technical solutions described in the present invention should be within the scope of the present invention.

The invention claimed is:

1. A method for automatically testing a raster image processor, comprising
   (1) submitting test samples;
   (2) executing each of the submitted test samples on a reference raster image processor and generating a reference bitmap for each of the test samples;
   (3) generating an abstract code of the reference bitmap for each of the test samples and entering each abstract code into a record list of permanent abstract codes;
   (4) executing each of the submitted test samples on a raster image processor to be tested and generating a test bitmap for each of the test samples;
   (5) generating an abstract code of the test bitmap for each of the test samples, comparing the abstract code of the test bitmap with the abstract code of the reference bitmap for the same test sample recorded in the record list of permanent abstract codes, and storing the abstract code of the test bitmap into a record list of temporary abstract codes if the abstract code of the test bitmap and the abstract code of the reference bitmap for the same test sample are not consistent with each other; and
   (6) checking the test bitmap and reference bitmap for the test sample corresponding to the abstract codes recorded in the record list of temporary abstract codes, returning a message indicating an error to the developer if the test bitmap is erroneous, and replacing a record in the record list of permanent abstract codes with a corresponding record in the record list of temporary abstract codes if the reference bitmap is erroneous.

2. The method according to claim 1, wherein the step (1) of submitting test samples comprises the following steps:
   (a) preparing and submitting a test script;
   (b) analyzing a type of the test script to determine whether the type of the test script is allowable, and if no, reporting that the type of the test script is mismatching and ending;
   (c) traversing the test script, extracting the test samples from the test script, and submitting the extracted test samples.

3. The method according to claim 2, wherein in the step (b), the type of the test script comprises "folder set and template set" and "file and template" set.

4. The method according to claim 3, wherein the process of extracting the test samples in the step (c) is as follows:
   where the type of the test script is "folder set and template set", all the files in the folder set are combined with all the templates in the template set, wherein one file and one template are combined with each to form a test sample in a type of "file and template"; and
   where the type of the test script is "file and template" set, a test sample in the type of "file and template" is extracted directly.

5. The method according to claim 2, wherein, when a test document or template is added to the test script, the method further comprises the following step before the step (2):
   determining whether a test sample which is extracted from the test script having the added test document or template and is submitted has been recorded in the record list of permanent abstract codes, and if yes, skipping the execution of the test sample.

6. The method according to claim 1, wherein the step of executing each of the submitted test samples on the reference raster image processor or the raster image processor to be tested comprises recording the execution status into the record list of execution status, wherein the execution status comprises a DONE, UNDONE and EXEPTIONAL;
   if a test sample is ended properly in a process of execution, the execution status for the test sample is marked with DONE;
   if an error occurs in the process of execution of a test sample, the execution status for the test sample is marked with UNDONE; and
   if an abnormality occurs in the process of execution of a test sample, the execution status for the test sample is marked with EXEPTIONAL.

7. The method according to claim 6, wherein the step of executing each of the submitted test samples on the reference raster image processor or the raster image processor to be tested and generating a test bitmap for each of the test samples comprises the following steps:
   (a) initializing the record list of execution status and cleaning up data in the record list of execution status;
   (b) determining whether a submitted test sample has been recorded in the record list of execution status;
   if yes, performing the following steps according to the execution status of the submitted test sample:
   turning to the step (e) if the execution status of the submitted test sample is DONE or EXCEPTIONAL;
   updating the execution status of the submitted test sample to be EXCEPTIONAL if the execution status of the submitted test sample is UNDONE;
   if no, adding the submitted test sample to the record list of execution status and setting the status of the submitted test sample to be EXCEPTIONAL;
   (c) interpreting the submitted test sample and generating a reference bitmap or test bitmap for the submitted test sample;

(d) updating the execution status of the submitted test sample in the record list of execution status to be DONE, if the submitted test sample is interpreted properly; updating the execution status of the submitted test sample in the record list of execution status to be UNDONE, if an error occurs in the process of interpreting the submitted test sample; and resubmitting each of the test samples and turning to the step (b), if an abnormality occurs in the process of interpreting the submitted test sample; and (e) repeating the steps (b)-(d) to interpret a next submitted test sample until each of the test samples are interpreted.

8. The method according to claim 6, wherein the step (6) further comprises:

detecting the record list of execution status; and returning a message to a developer, if there is a test sample in the record list of execution status, whose execution status is UNDONE or EXCEPTIONAL.

9. A system for automatically testing a raster image processor, comprising:

a reference raster image processor;

a raster image processor to be tested; and an abstract code processor, wherein the abstract code processor is configured to generate an abstract code of a reference bitmap and an abstract code of a test bitmap for a test sample after the test sample is interpreted by the reference raster image processor or the raster image processor to be tested and to compare the abstract code of the reference bitmap with the abstract code of the test bitmap for the test sample to determine whether the abstract code of the reference bitmap and the abstract code of the test bitmap for the test sample are consistent with each other.

10. The system according to claim 9, further comprising:

a database module configured to store a record list of permanent abstract codes and a record list of temporary abstract codes, wherein the record list of permanent abstract codes is configured to store abstract codes of reference bitmaps and the record list of temporary abstract codes is configured to store the abstract code of the test bitmap which is inconsistent with the abstract code of the reference bitmap for the same test sample;

a database interface module configured to perform operations of adding, modifying, deleting and inquiring on data in the database module;

a data display module configured to display the data stored in the database module; and an import/export module configured to import records in the record list of temporary abstract codes to the record list of permanent abstract codes.

11. The system according to claim 10, wherein the database module is also configured to store a record list of execution status for recording the execution status that a test sample is executed on the raster image processor to be tested, the execution status comprises a DONE, UNDONE and EXEPTIONAL, if a test sample is ended properly in a process of execution, the execution status for the test sample is marked with DONE, if an error occurs in the process of execution of a test sample, the execution status for the test sample is marked with UNDONE, and if an abnormality occurs in the process of execution of a test sample, the execution status for the test sample is marked with EXEPTIONAL.

12. The system according to claim 11, further comprising a subsystem for automatically submitting test samples, which is configured to perform automatic submitting of test samples, wherein the subsystem for automatically submitting test samples comprises a script generator, a script parser and a task analyzer, wherein the script generator is configured to generate a test script;

the script parser is configured to parse the test script generated by the script generator, extract test samples from the test script, and send the extracted test samples to the task analyzer; and the task analyzer is configured to determine whether a current test sample to be executed has been recorded in the record list of execution status or in the record list of permanent abstract codes and to process the test sample based on the result of determination.

13. The system according to claim 10, further comprising a subsystem for automatically submitting test samples, which is configured to perform automatic submitting of test samples, wherein the subsystem for automatically submitting test samples comprises a script generator, a script parser and a task analyzer, wherein the script generator is configured to generate a test script;

the script parser is configured to parse the test script generated by the script generator, extract test samples from the test script, and send the extracted test samples to the task analyzer; and the task analyzer is configured to determine whether a current test sample to be executed has been recorded in the record list of execution status or in the record list of permanent abstract codes and to process the test sample based on the result of determination.

14. The system according to claim 9, further comprising a subsystem for automatically submitting test samples, which is configured to perform automatic submitting of test samples, wherein the subsystem for automatically submitting test samples comprises a script generator, a script parser and a task analyzer, wherein the script generator is configured to generate a test script;

the script parser is configured to parse the test script generated by the script generator, extract test samples from the test script, and send the extracted test samples to the task analyzer; and the task analyzer is configured to determine whether a current test sample to be executed has been recorded in the record list of execution status or in the record list of permanent abstract codes and to process the test sample based on the result of determination.

* * * * *

UNITED STATES PATENT AND TRADEMARK OFFICE
CERTIFICATE OF CORRECTION

PATENT NO. : 8,692,842 B2  Page 1 of 1
APPLICATION NO. : 13/121317
DATED : April 8, 2014
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this

Twenty-ninth Day of September, 2015

Michelle K. Lee
*Director of the United States Patent and Trademark Office*